United States Patent [19]

Matsuyama et al.

[11] 3,982,044
[45] Sept. 21, 1976

[54] SILVER HALIDE PHOTOGRAPHIC EMULSIONS USED FOR ELECTRON BEAM RECORDING

[75] Inventors: Junichi Matsuyama; Yoshiyuki Nakazawa; Yasuharu Nakamura; Reiichi Ohi, all of Minami-ashigara; Reiichi Ohi, all of Minami-ashigara, Japan; Tokiharu Kondo, deceased, late of Minami-ashigara, Japan, by Yoshiharu Kondo Odawara, Japan, legal representative

[73] Assignee: Fuji Photo Film Co., Ltd., Minami-ashigara, Japan

[22] Filed: July 3, 1975

[21] Appl. No.: 593,337

Related U.S. Application Data

[63] Continuation-in-part of Ser. No. 455,089, March 27, 1974, abandoned, which is a continuation-in-part of Ser. No. 206,903, Dec. 10, 1971, abandoned.

[30] Foreign Application Priority Data

Dec. 10, 1970  Japan.............................. 45-109871

[52] U.S. Cl..................................... 427/43; 96/139; 250/475; 346/1
[51] Int. Cl.$^2$........................................... B05D 3/06
[58] Field of Search...................... 96/139, 129, 120; 427/43; 250/475; 346/1

[56] References Cited
UNITED STATES PATENTS

| | | | |
|---|---|---|---|
| 2,153,930 | 4/1939 | Kendall................................. | 96/139 |
| 2,496,899 | 2/1950 | Thompson ............................ | 96/139 |
| 3,303,341 | 2/1967 | Fram et al. ............................ | 96/82 |
| 3,658,544 | 4/1972 | Iwama et al. ......................... | 250/475 |

OTHER PUBLICATIONS

Herz The Photographic Action of Ionizing Radiations, pp. 56–61, Wiley–Interscience, New York, 1969.

Primary Examiner—J. Travis Brown
Attorney, Agent, or Firm—Sughrue, Rothwell, Mion, Zinn and Macpeak

[57] ABSTRACT

Fine grain silver halide photographic emulsions adapted for electron beam recording containing at least one compound represented by the following formula;

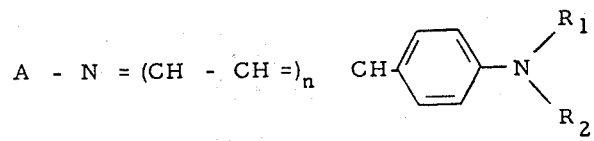

wherein A represents an aliphatic group (substituted or unsubstituted), preferably an alkyl group, a substituted alkyl group, an aryl group, a substituted aryl group or a 5- or 6-membered heterocyclic ring containing at least one nitrogen atom, $R_1$ and $R_2$ represent a hydrogen atom or a lower alkyl group, and $n$ represents 0 or 1.

15 Claims, No Drawings

SILVER HALIDE PHOTOGRAPHIC EMULSIONS USED FOR ELECTRON BEAM RECORDING

This application is a Continuation-in-Part application of Ser. No. 455,089 filed on Mar. 27, 1974, now abandoned, which in turn was a Continuation-in-Part application of Ser. No. 206,903 filed on Dec. 10, 1971, now abandoned.

BACKGROUND OF THE INVENTION

1. Field of the Invention

The present invention relates to silver halide photographic emulsions and especially to silver halide photographic emulsions in which the sensitivity of the fine grain silver halide crystals in the emulsion to electron beams is increased remarkably by adding a specific compound to the emulsions.

2. Description of the Prior Art

In the preparation of silver halide photographic emulsions, chemical sensitization methods, namely, sulfur sensitization by thiourea derivatives or sodium thiosulfate, reduction sensitization by stannous chloride or hydrazine, and gold sensitization by salts of noble metals such as gold, platinum and palladium are well-known processes for increasing sensitivity. However, sensitization of photographic materials to be used for electron beam recording is insufficient by these known methods.

The electron beam recording process is capable of high density recording. In order to obtain an image having high quality by this process it is necessary that the silver halide particles of the sensitive material be as small as possible. However, because reducing the particle size of the silver halide particles generally brings a lowering of electron beam sensitivity, it is necessary to develop a new sensitization process. It is also important to reduce the surface charge of the sensitive element at exposure to the electron beam in order to obtain a distinct image. Accordingly, it is necessary, to reduce exposure, to increase the speed of the electron beam-sensitive element and consequently a sensitive element having a high electron beam sensitivity is required.

In short, in preparing sensitive elements used for electron beam recording, it is required to prepare silver halide photographic emulsions containing silver halide crystals the particle size of which is as small as possible and having a high electron beam sensitivity. This is an important problem in the art of sensitization to electrons.

SUMMARY OF THE INVENTION

As the result of various studies, the present inventors have found a process for remarkably increasing the electron sensitivity of silver halide photographic emulsions which comprises adding a certain compound to silver halide photographic emulsions comprising finely-divided silver halide crystals.

One object of the present invention is to provide fine grain silver halide photographic emulsions having a high electron beam sensitivity. This object has been attained by adding at least one compound represented by the following formula to a fine grain silver halide photographic emulsion:

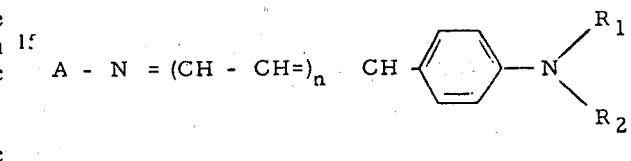

wherein A represents an aliphatic group containing a substituted aliphatic group and an unsubstituted aliphatic group, preferably an alkyl group (i.e., an unsubstituted alkyl group and a substituted alkyl group) e.g., a methyl group, ethyl group, propyl group, isopropyl group, butyl group, hexyl group or other 1 to 6 carbon atom alkyl group, hydroxy alkyl group such as a $\beta$-hydroxy-ethyl group, aralkyl group such as phenylmethyl group, allyl group such as vinylmethylgroup, etc.; a mononuclear aryl group (i.e., an unsubstituted aryl group and a substituted aryl group, e.g., a phenyl group, an alkyl-substituted aryl group, or a halogen-substituted aryl group such as tolyl group and chlorophenyl group, etc.); or a 5- or 6-membered heterocyclic nucleus containing at least one nitrogen atom, e.g., series of morpholine nucleus, of pyridine nucleus, or piperidine nucleus, of oxazole nucleus, of imidazole nucleus, of thiazole nucleus, of benzoxazole nucleus, of benzimidazole nucleus, of benzothiazole nucleus, of pyrimidine nucleus, of thiazolidine nucleus, of thiadiazole nucleus, of triazole nucleus and of a tetrazole nucleus, where the heterocyclic nucleus may be substituted by substituents; $R_1$ and $R_2$ represents a hydrogen atom or a lower alkyl group, e.g., methyl group or n-propyl group; and $n$ represents 0 or 1.

The fine grain silver halide according to the present invention is preferred by a silver halide, having a mean grain size by diameter no greater than $0.2\mu$, particularly from 0.08 to $0.05\mu$.

The following are typical compounds used in the present invention. However, the compounds are not intended to be limited thereby.

1.

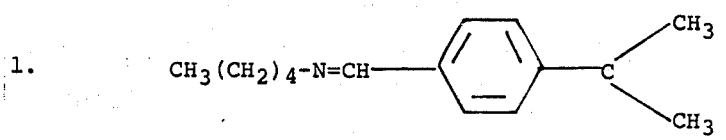

b.p. 135–140°C./2mmHg

2.

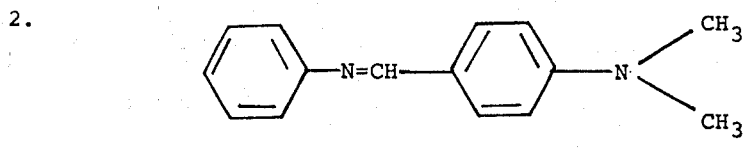

m.p. 98–99°C

3.
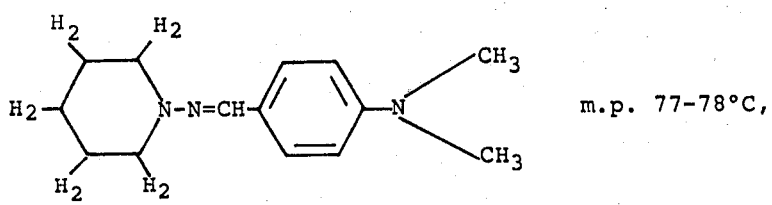
m.p. 77-78°C,
4.
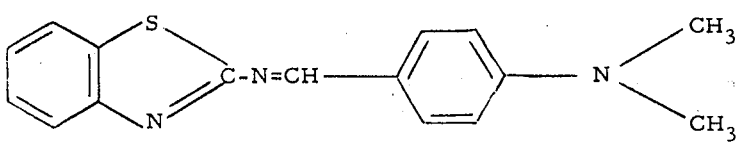
m.p. 186-187°C,
5.
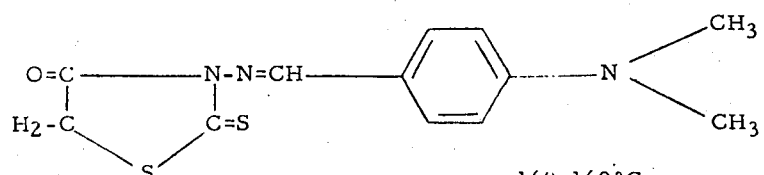
m.p. 168-169°C,
6.
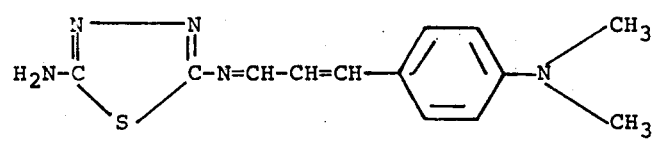
m.p. 223°C,
7.
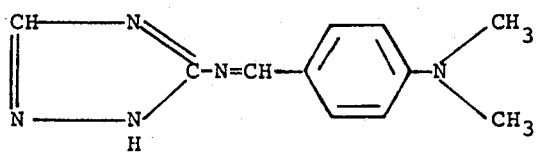
m.p. 222-223°C,
8.
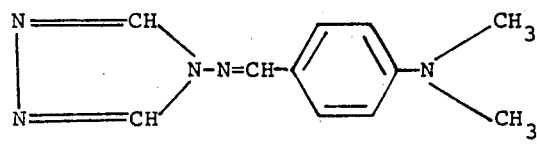
m.p. 194-195°C,
9.
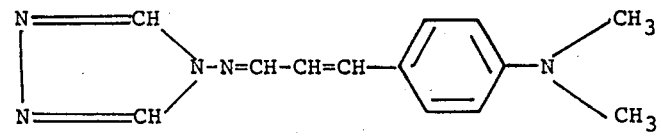
m.p. 218°C,

10.

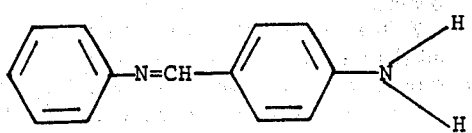

m.p. 110°C, and

11.

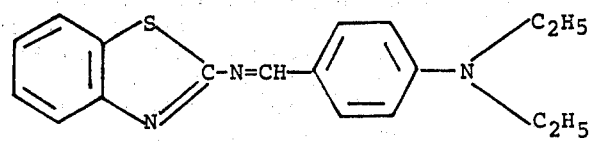

m.p. 186-187°C

Compound 2 of the present invention can be synthesized by the method described in Beilstain Vol. 14, Page 33. Other compounds can be synthesized from corresponding aldehydes and amino compounds by a similar method.

The silver halide photographic emulsions used in the present invention are those containing gelatin, gelatin derivatives or other natural or synthetic polymers, e.g., cellulose, cellulose derivatives, arabic gum, agar-agar, polyvinyl alcohol, etc. as the binder.

As the silver halide, simple or complicated silver halides such as silver chloride, silver bromine, silver chloride bromide, silver iodide bromide and silver chloride iodide bromide may be used, with most excellent results being obtained upon using a silver bromide emulsion or a silver iodide bromide emulsion.

The sensitization effect of the present invention can be obtained by adding the compounds of the present invention to silver halide photographic emulsions prepared by any common method just before application (coating). However, a similar effect can be obtained by adding said compounds during the step of forming the silver halide crystals, the step of physical ripening or the step of chemical ripening.

The silver halide photographic emulsions may be or not be sensitized by sulfur compounds and gold complex salts or may be subjected to spectral sensitization by sensitizing dyes such as cyanine dyes and merocyanine dyes.

To the silver halide photographic emulsions of the present invention there may be added, by any procedure known to the art, other chemical sensitizing agents, stabilizers, antifogging agents, matting agents, antistatic agents, hardeners, surface active agents, plasticizers, and development accelerators. If desired, color formers, fluorescent whitening agents and color toning agents can also be added by methods known to the art.

The compounds used in the present invention are usually added as a solution in a suitable solvent, such as methanol and ethanol. The relevant amount to be added can vary over the wide range of about $10^{-6}$ to $10^{-1}$ gram mols of the compound or compounds per kg of the emulsion, according to the desired effect, but not be limited thereto.

The silver halide photographic emulsion after exposure to an electron beam can be processed in an usual manner. Suitable developing agents which can be used are 4-aminophenols such as N-methyl-4-amino-phenol hemisulfate, 3-pyrazolidones such as 1-phenyl-3-pyrazolidone, polyhydroxybenzenes such as hydroquinone, phenylenediamines such as N,N-diethyl-p-phenylenediamine, etc. The photographic emulsion can be subjected to color photographic processing to obtain a color image, which suitably includes color development, bleaching, and fixing. If desired, the bleaching and fixing steps can be done in one bath. Suitable processing temperatures can range from about 18°C to 60°C, although temperatures lower than 18°C can be used if desired. The photosensitive member of the present invention can be subjected to a so-called "lith-type" development process to provide a very high contrast, such as described in *Photographic Processing Chemistry* by L.F.A. Mason (1966) at pp. 163 - 165.

The present invention will be explained in more detail by an example.

EXAMPLE I

A gelatin silver bromide emulsion having a 0.08 micron of mean grain size by diameter was prepared by a simultaneous mixing process. After being subjected to sulfur sensitization and gold sensitization, the resulting sample was divided into two parts. One part was kept intact while a compound of the present invention was added to the other part. These were applied onto cellulose triacetate film bases to produce two samples.

A characteristic curve was obtained by stepwise exposure to an electron beam in the range of $10^{-10}$ to $10^{-8}$ coulombs/cm² beam current density at a 20 kV acceleration voltage, whereafter developing was conducted by using D-76 developing solution conventionally employed in the photographic processing.

In Table 1, the common logarithms of ratio of sensitization for the case of adding each of Compounds 1 - 11, respectively, as compared to the case of not adding any compounds of the present invention are shown as the sensitization rate of each compound.

Table 1

| | Results of Electron Beam Sensitometry | | |
|---|---|---|---|
| Compound | Amount of gram mols/kg of emulsion | Sensitization Rate log E at [fog + 0.5] | Fog |
| None | 0 | 0 | 0.03 |
| 1 | $1 \times 10^{-4}$ | 0.30 | 0.03 |
| 2 | $1 \times 10^{-4}$ | 0.25 | 0.03 |
| 3 | $1 \times 10^{-4}$ | 0.35 | 0.04 |
| 4 | $1 \times 10^{-3}$ | 0.33 | 0.03 |
| 5 | $1 \times 10^{-3}$ | 0.27 | 0.04 |
| 6 | $1 \times 10^{-4}$ | 0.49 | 0.05 |
| 7 | $1 \times 10^{-3}$ | 0.30 | 0.04 |
| 8 | $1 \times 10^{-4}$ | 0.44 | 0.03 |
| 9 | $1 \times 10^{-4}$ | 0.50 | 0.03 |
| 10 | $1 \times 10^{-4}$ | 0.27 | 0.03 |
| 11 | $1 \times 10^{-3}$ | 0.34 | 0.03 |

It will be understood from Table 1 that the photographic sensitivity of the fine grain silver halide crystals in the emulsion to electron beams is increased remarkably by adding to the emulsion a compound according to the present invention, without increase in fog-formations.

EXAMPLE II

Using the simultaneous mixing process as described in Example I, gelatin silver bromide emulsions having various mean grain size values in microns were produced. These emulsions were produced by the following method:

To 40 grams of gelatin dissolved in 500 mm. of water there was added at 40°C., an aqueous solution containing 100 grams of silver nitrate and 700 ml. of water and an aqueous solution of 70 grams of potassium bromide and 700 ml. of water while controlling silver potential in accordance with a conventional double jet process.

The mean grain size of the various emulsions produced in accordance with the above-described process range from 0.08 microns up to 0.6 microns. Then, using Compounds 1, 4 and 9 as set forth above in this application, the sensitivity to electron beams was determined as set forth in Example I. The results as designated by increase of sensitivity were as follows:

| Grain Size* | 0.08μ | 0.15μ | 0.20μ | 0.30μ | 0.6μ |
|---|---|---|---|---|---|
| Compound used (concentration:gram mol/Kg of emulsion) | | | | | |
| Compound 1(1×10⁻⁴) | 0.30 | 0.25 | 0.20 | 0.05 | 0.02 |
| Compound 4(1×10⁻⁴) | 0.33 | 0.27 | 0.22 | 0.06 | 0.02 |
| Compound 9(1×10⁻⁴) | 0.50 | 0.35 | 0.27 | 0.08 | 0.03 |

*a mean grain size by number (measured by a conventional projected area method).

Example II illustrates the significance of having mean grain size of the silver halide particles no larger than 0.2 micron as measured by the diameter thereof.

Various modifications of the invention will be apparent to those skilled in the art.

What is claimed is:

1. In a process for recording electron beams which comprises imagewise exposing to electron beams a photographic fine grain silver halide emulsion containing fine silver halide grains having a mean grain size by diameter no greater than 0.2 micron and processing said silver halide emulsion, the improvement wherein said photographic fine grain silver halide emulsion contains at least one compound represented by the following formula;

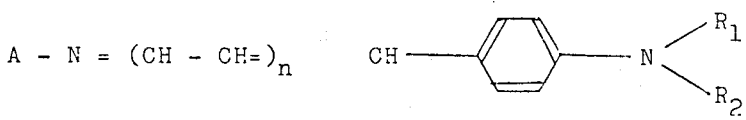

wherein A represents an aliphatic group, an aryl group, or a 5- or 6-membered heterocyclic ring containing at least one nitrogen atom selected from the group consisting of a morpholine nucleus, a piperidine nucleus, a 2-thio-4-oxo-thiazolidine nucleus, a thiadiazole nucleus and a 1,3,4-triazole nucleus, $R_1$ and $R_2$ represent a hydrogen atom or a lower alkyl group, and $n$ represents 0 or 1; said at least one compound being present in an amount sufficient to sensitize said emulsion to electron beams.

2. The process of claim 1 wherein A represents an alkyl group of from 1 to 6 carbon atoms, a hydroxyalkyl group, an aralkyl group, an allyl group, an aryl group, or a 5- or 6-membered heterocyclic ring containing at least 1 nitrogen atom selected from the group consisting of a morpholine nucleus, a pyridine nucleus, a piperidine nucleus, an oxazole nucleus, an imidazole nucleus, a thiazole nucleus, a benzoxazole nucleus, a benzimidazole nucleus, benzthiazole nucleus, a pyrimidine nucleus, a thiazolidine nucleus, a thiadiazole nucleus, a triazole nucleus and a tetrazole nucleus.

3. The process of claim 2 wherein the mean grain size by diameter of the silver halide particles is from 0.08 to 0.05 micron.

4. The process of claim 2 wherein the silver halide emulsion comprises silver bromide.

5. The process of claim 2 wherein said at least one compound is:

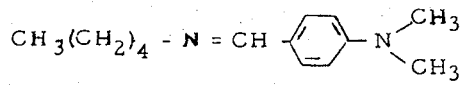

6. The process of claim 2 wherein said at least one compound is:

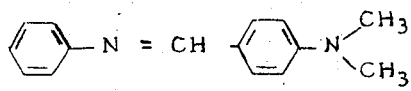

7. The process of claim 2 wherein said at least one compound is:

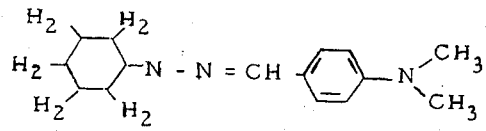

8. The process of claim 2 wherein said at least one compound is:

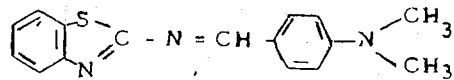

9. The process of claim 2 wherein said at least one compound is:

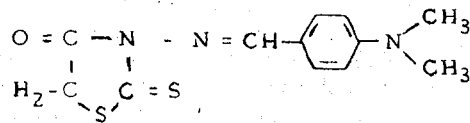

10. The process of claim 2 wherein said at least one compound is:
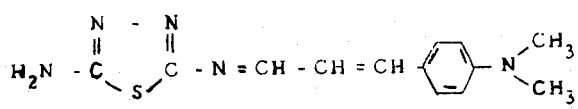
11. The process of claim 2 wherein said at least one compound is:
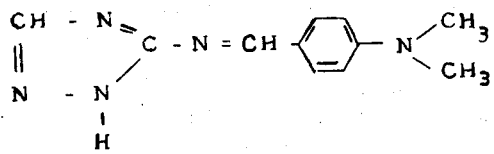
12. The process of claim 2 wherein said at least one compound is:
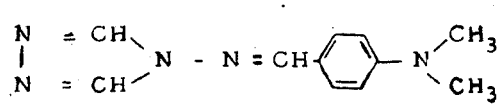
13. The process of claim 2 wherein said at least one compound is:
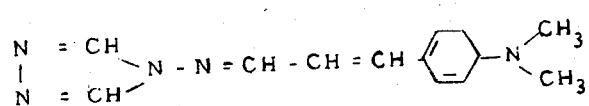
14. The process of claim 2 wherein said at least one compound is:
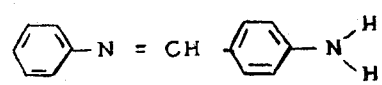
15. The process of claim 2 wherein said at least one compound is:
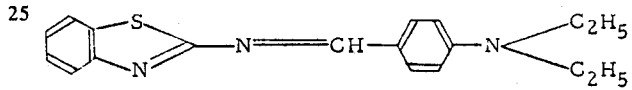
* * * * *